United States Patent
Shachar et al.

(10) Patent No.: US 6,560,280 B1
(45) Date of Patent: May 6, 2003

(54) VIDEO TRANSMISSION SYSTEM

(75) Inventors: Yair Shachar, Ramat Gan (IL); Yaron Menczel, Mevasseret Zion (IL)

(73) Assignee: Vcon Ltd., Herzliya (IL)

( * ) Notice: Subject to any disclaimer, the term of this patent is extended or adjusted under 35 U.S.C. 154(b) by 0 days.

(21) Appl. No.: 09/017,098

(22) Filed: Feb. 2, 1998

(51) Int. Cl.$^7$ ................................................ H04B 1/66
(52) U.S. Cl. .................. 375/240; 375/240; 375/240.24; 348/441; 348/445; 348/469; 348/443; 348/555; 348/556
(58) Field of Search ............................ 375/240, 240.24; 348/445, 469, 441, 443, 555, 556, 558, 15, 578, 240, 222, 554, 571, 714, 500

(56) References Cited

U.S. PATENT DOCUMENTS

| | | | | |
|---|---|---|---|---|
| 5,537,150 A | * | 7/1996 | Sugiyama et al. | 348/558 |
| 5,541,651 A | * | 7/1996 | Iura et al. | 348/240 |
| 5,936,673 A | * | 8/1999 | Agarwal | 348/420 |
| 6,124,881 A | * | 9/2000 | Terui et al. | 348/15 |
| 6,188,440 B1 | * | 2/2001 | Toujima et al. | 348/554 |

OTHER PUBLICATIONS

Recommendation T.35 (1991,—Procedure for the Allocation of CCITT Defined Codes for Non–Standard Facilities.
"Recommendation H.261 (03/93)—Video Codec for Audiovisual Services at p x 64 kbit/s";.
"Recommendation H.320 (03/96)—Narrow–band Visual Telephone Systems and Terminal Equipment";.
"Recommendation H.221 (07/95)—Frame Structure for a 64 to 1920 kbit/s Channel in Audiovisual Teleservices";.
"Recommendation H.242 (03/96)—System for Establishing Communication Between Audiovisual Terminals Using Digital Channels up to 2 Mbit/s";.
Recommendation H.231 (1993)—Multipoint Control Units for Audiovisual Systems Using Digital Channels.
"Recommendation H.243 (03/96)—Procedures for Establishing Communication Between Three or More Audiovisual Terminals Using Digital Channels up to 1920 kbit/s";.
"Recommendation H.245 (03/96)—Control Protocol for Multimedia Communication";.
"Recommendation H.225 (11/96)—Media Stream Packetization and Synchronization on Non–Guaranteed Quality of Service LANs";.
"Recommendation H.263 (03/96)—Video Coding for Low Bit Rate Communication";.
"Recommendation H.321 (03/96)—Adaptation of H.320 Visual Telephone Terminals to B–ISDN Environments";.
"Recommendation H.322 (03/96)—Visual Telephone Systems and Terminal Equipment for Local Area Networks Which Provide a Guaranteed Quality of Service";.

(List continued on next page.)

Primary Examiner—Andy Rao
Assistant Examiner—Shawn S. An
(74) Attorney, Agent, or Firm—Eitan, Pearl, Latzer & Cohen Zedek, LLP.

(57) ABSTRACT

In a video system incoming video having a given frame size is sent over a video transmission system that supports a different frame size. When a transmitting terminal in the transmission system receives the incoming video, the terminal does not scale the video to fit the transmitted frame size. Instead, the video compression encoder only encodes and sends the data associated with the incoming video. The encoder does not encode or send the rest of the standard transmitted frame. At a receiving terminal in the transmission system, all of the received data is decoded. However, because the decoded data will correspond to the original incoming frame size, this data, rather than the entire transmitted frame, is scaled to match the size of the display or the target window.

13 Claims, 8 Drawing Sheets

OTHER PUBLICATIONS

"Recommendation H.323 (11/96)—Visual Telephone Systems and Equipment for Local Area Networks Which Provide a Non–Guaranteed Quality of Service".

"Recommendation H.324 (03/96)—Terminal for Low Bit Rate Multimedia Communication";.

"Recommendation H.230 (07/95)—Frame–Synchronous Control and Indication Signals for Audiovisual Systems".

Data Handbook IC22 Desktop Video 1995.

Engineering Reference Specification (ERS) Vision Compression Processo 1998.

* cited by examiner

VIDEO TRANSMISSION SYSTEM

FIELD OF THE INVENTION

The present invention relates to video transmission systems and, more specifically, to a system that uses one video format to send video data defined in another format.

BACKGROUND OF THE INVENTION

A typical video component complies with one of a handful of video standards, For example, conventional televisions and VCRs sold in the United States and Japan conform to the NTSC standard while those sold in most of the rest of the world conform to the PAL standard. In addition, applications such as video conferencing may use modern video standards such as the H.261 standard defined by the International Telecommunication Union ("ITU").

Each standard defines characteristics of the video such as the size of a frame (i.e., the size of the image displayed on the screen). The height and width of a frame typically is defined in terms of the number of rows and columns of pixels (the individual "dots" of color that make up the displayed image), respectively. For example, for some applications the CIF standard specifies 352 columns and 288 rows of pixels in a frame.

Video applications such as video conferencing that send video signals between two or more terminals typically use some form of video compression. Video compression involves compressing the data that makes up the video stream so that the video data stream may be sent using less bandwidth. Thus, a compressed video signal may be sent over a channel having relatively low bandwidth or several compressed video signals may be sent over a channel that could support many fewer uncompressed video signals. As is apparent, the use of compressed video may provide significant cost savings.

To take advantage of compression and other advantages provided by the use of a particular standard, it is often necessary to send video from a video source that supports one format over a video transmission channel that supports a different format. In order to perform compression with interoperability between terminals of different vendors, several compression standards had been defined by the ITU.

Video compression standards such as ITU H.261 and H.263 do not, however, support the NTSC frame size. Instead, these standards support a frame size designated as CIF that has 288 rows and 352 columns. Some conventional systems interface NTSC video equipment with ITU-based transmission systems by scaling the NTSC frame to fit within a CIF frame. For example, an NTSC field with 240 rows is up-scaled before the video encoding process into a 288 row Image. The CIF frame (with 288 rows) is then transmitted to the receiving terminal and decoded as a CIF image. It should be emphasized, however, that this up-scaling does not provide better image resolution. Rather, there are still only 240 rows of real data.

Techniques such as these have several drawbacks. Due to the scaling operations discussed above, the encoder typically encodes an image with the full size of the transmitted format (e.g., 352×288 for CIF) instead of the true size of the original image (e.g., 320×240 for NTSC). This causes an unnecessary increase in the bit rate and in the amount of CPU processing power used to process the video (up to 30% in the NTSC-CIF example).

Moreover, these techniques scale the image twice. The encoder up-scales the original image (e.g., NTSC) as described above, then the decoder scales the received image (e.g., CIF) to conform to the size of the display or window. Since these scaling operations are not correlated, scaling distortion may occur. In view of these and other problems, a need exists for an improved method of transmitting video defined in one format using a transmission system that uses a different video format.

SUMMARY OF THE INVENTION

The invention provides a system and method for sending incoming video having a given frame size over a video transmission channel that supports a different frame size. Incoming video from a video source such as a camera is encoded by an encoder that sends video to a decoder using a video standard that supports the different frame size. The decoder processes the received video and provides it to a video destination such as a monitor.

In accordance with the Invention, when the encoder receives the incoming video, the encoder does not scale the video to fit the frame size used by the transmission system. Instead, the encoder simply encodes the data associated with the incoming video. Similarly, the encoder sends only the encoded data to the decoder. Thus, the encoder does not process or send video data associated with the areas of the transmitted frame that do not correspond to the incoming video.

The decoder decodes all of the data it receives. However, the decoded data will correspond to the original incoming frame size. This data is then scaled as necessary to fit the size of the display or the target window.

In one embodiment, the teachings of the invention are applied to embed an NTSC video stream into a CIF-based video stream. The NTSC video stream is converted to a 240×320 frame to provide a good match with the size of macro blocks and groups of macro blocks defined in the H.261 standard. In accordance with the invention, the system only encodes and sends the CIF frame macro blocks that are associated with the NTSC frame.

A system constructed according to the invention may achieve considerable improvements in compression performance in comparison to conventional systems because the system processes and sends less data yet provides the same amount of video information to the decoder. Moreover, the system may provide better image quality than some conventional systems because fewer image scaling operations may be performed on the video data.

Thus, a method of sending an incoming video stream associated with a first frame size via a transmit video stream associated with a second frame size includes the steps of associating the two frame sizes so that a portion of the pixels detained in the transmit frame is not associated with the pixels of the incoming frame, providing the transmit video stream by encoding pixels associated with the incoming video stream and not encoding pixels in the portion of the transmit frame that is not associated with the incoming frame.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Figure 1:
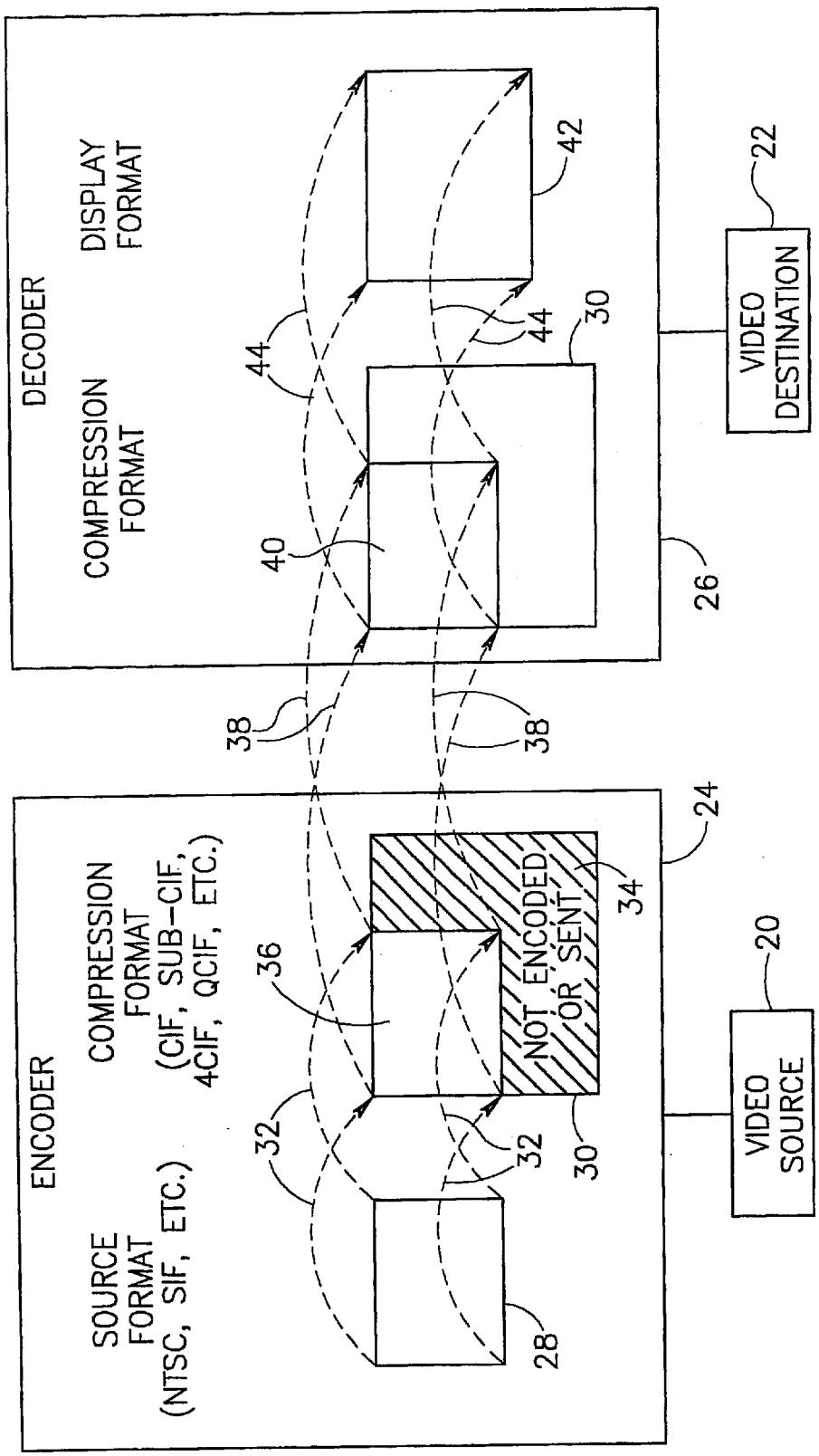
FIG. 1 is a block diagram and graphical representation of one embodiment of a video system illustrating some of the principles of the invention.

FIG. 1 is a block and graphical diagram illustrating some of the basic operating principles of one embodiment of a video system S constructed according to the invention. The video system S includes a video source 20 that sends a video stream to a video destination 22 via an encoder 24 and a decoder 26.

The data stream from the video source 20 is associated with a particular format, designated in FIG. 1 as a source format 28. The source format 28 specifies a frame size that typically is defined in terms of rows and columns of pixels.

The encoder 24 compresses the data stream and sends the compressed video stream to the decoder 26. The compressed video stream is defined in another format 30, designated as a compression format, that specifies a frame size that is larger than the frame size of the source format 28. As represented by lines 32 in FIG. 1, the operation of compressing the data stream and sending it in the other format may include, conceptually, a mapping of the source format frame 28 into the compression format frame 30. Due to the differences in the frame sizes, there are numerous data areas 34 in the compression frame 30 that are not associated with any of the pixels in the source frame 28.

In accordance with the invention, the encoder 24 only encodes the data associated with the source format 28. That is, the data in block 36. The portion 34 of the compression frame 30 not associated with the source format (the shaded portion 34 of the frame 30) is not encoded. As represented by lines 38, the encoder 24 only sends the encoded data 36 to the decoder 26.

The decoder 26 decompresses the received video stream and provides it to the video destination 22. However, since the decoder 26 is set up to handle the larger frames 30, the frame 30 is, in effect, only partially "filled." Thus, the decoder 26 must map this portion 40 of the frame 30 (rather than the entire frame 30) to the display format 42.

The display format 42 represents the size of the display screen or the size of the window in the display screen within which the video is to be displayed. Thus, as represented by lines 44, after the data from the "filled" portion 40 of the frame 30 is decompressed, the decoder 26 scales it to fit the display format 42.

Figure 2:
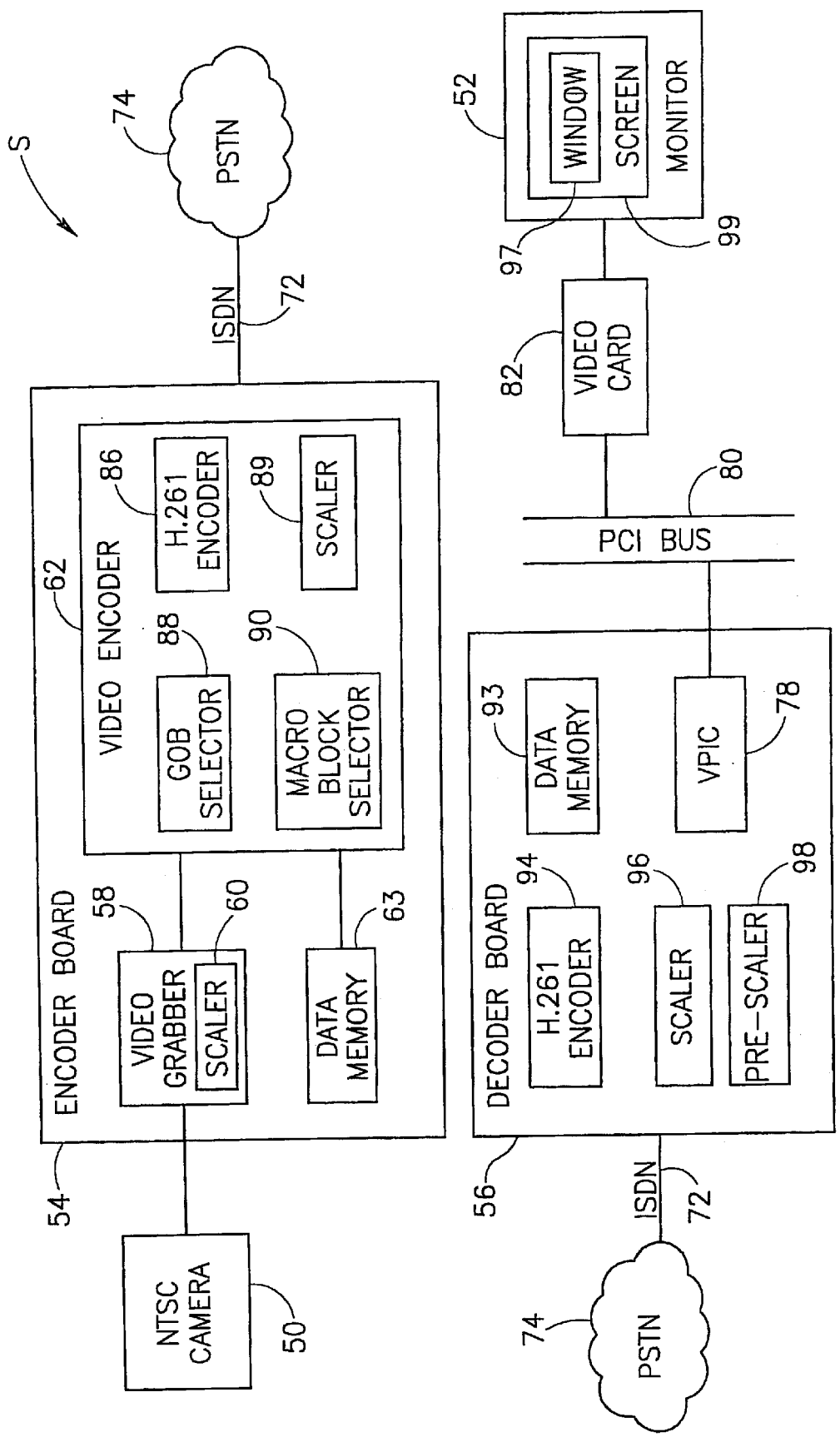
FIG. 2 is a block diagram of one embodiment of a video transmission system constructed according to the invention.

FIG. 2 illustrates one embodiment of a system S that sends a video stream from an NTSC camera 50 to a display monitor 52 via a CIF-based video encoder 54 and decoder 56. The encoder 54 may be used to transmit video in a video conferencing system (see, for example, FIG. 8). It converts video frames from the camera 50 into a compressed data stream. The decoder 56 may be used to receive video in the video conferencing system. It converts the compressed data stream into video frames that are sent to the monitor 52.

Figure 3B:
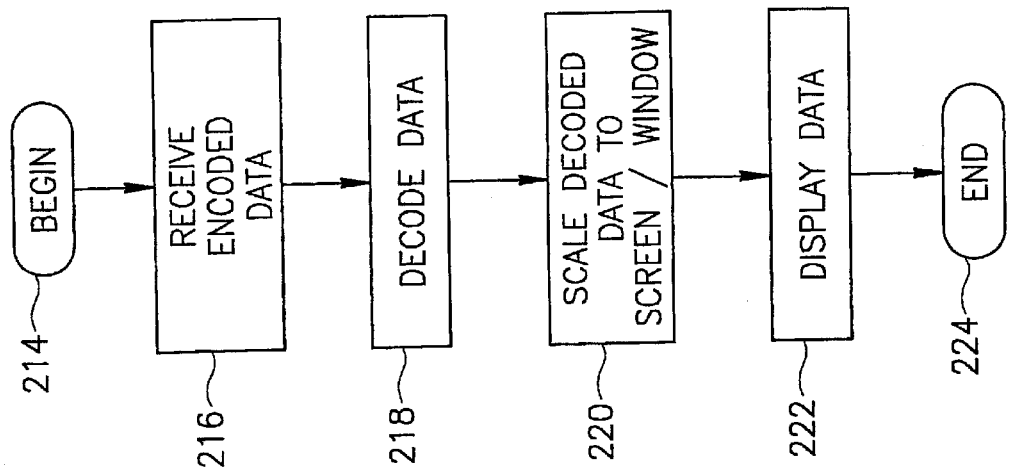
FIGS. 3A and 3B are flowcharts illustrating video processing operations that may be performed by the system of FIG. 2.
Figure 3A:
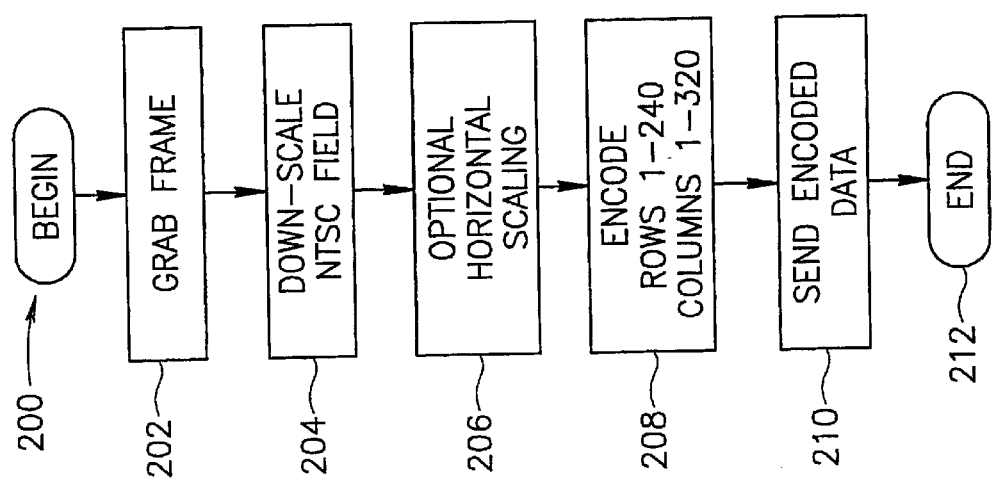

An overview of operations performed by the system of FIG. 2 for one frame of video data is described in FIGS. 3A and 3B. FIG. 3A describes the operations associated with the encoder 54 (the top half of FIG. 2) beginning at block 200, FIG. 3B describes the operations associated with the decoder 56 (the bottom half of FIG. 2) beginning at block 214.

At block 202, a video grabber 58 (FIG. 2) grabs a frame of the NTSC data stream generated by the NTSC camera 50. In some cases, the video grabber 58 may only grab one of the two fields in an NTSC frame. In this context. The term "frame" as used herein may refer to either a field or a frame. The video grabber 58 processes the NTSC video stream to generate a frame of video data having a selected number of rows and columns of pixels. At block 204, a scaler 60 in the video grabber 58 down-scales the NTSC data stream from the 481 visible rows per the NTSC standard to 240 rows. Then, at block 206, the scaler 60 may perform a horizontal scaling operation on the frame. For example, to maintain the original aspect ratio in the image after the vertical scaling operation discussed above, the scaler 60 may perform horizontal down-scaling to reduce the number of visible "columns" from approximately 650 to 320. The video grabber 58 then outputs a video stream that includes frame synchronization signals and a frame of video date of the designated size.

At block 208, a video encoder 62 compresses the video stream from the video grabber 58 using the H.261 video compression scheme. As discussed in detail below, the encoder 62 encodes the data into an H.261 CIF frame. However, only a portion of the CIF frame is encoded.

Figure 4:
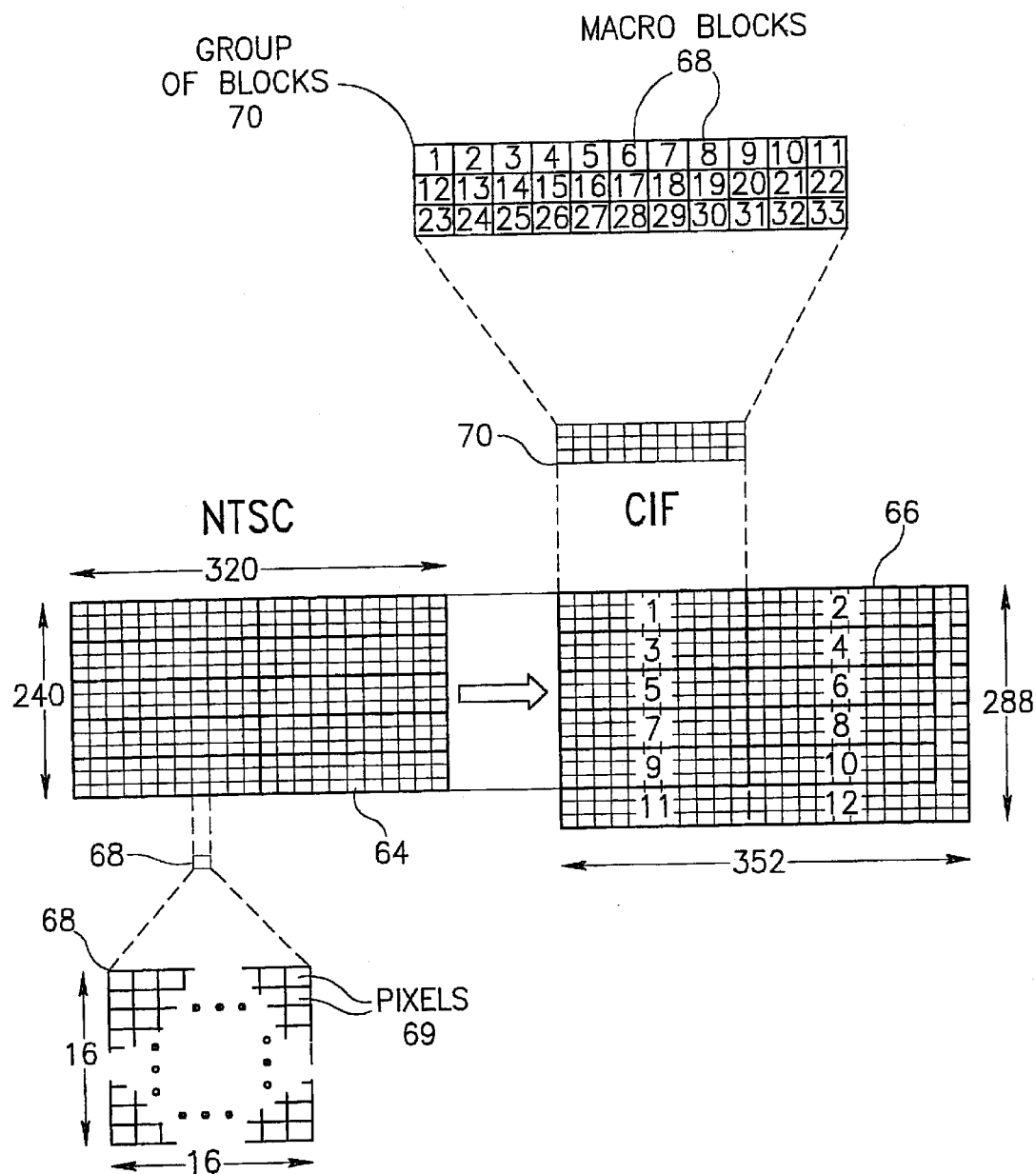
FIG. 4 is a graphical representation of an NTSC based frame embedded into a CIF frame according to one embodiment of the invention.

FIG. 4 illustrates the relationship between a frame that may be defined for the NTSC data and a CIF frame 66. The incoming video Is formatted into a frame 64 (referred to hereafter simply as an NTSC frame) that has 240 rows and 320 columns of pixels. As discussed below, this size is selected to facilitate the mapping of the frame 64 to the CIF frame 66. It will be appreciated by one skilled in the art, however, that the incoming NTSC video may be represented using many other frames sizes.

The CIF frame 68 in FIG. 4 has 288 rows and 352 columns. Thus, absent scaling, the NTSC frame 64 only maps to a portion of the CIF frame 66. This relationship is illustrated in FIG. 4 which shows an NTSC frame superimposed on the CIF frame 66. The CIF frame 66 also illustrates several types of data elements defined in the H.261 specification. Each 16×16 block of pixels 69 in the CIF frame 66 defines a macro block 68. Thus, the CIF frame 66 consists of an 18×22 array of macro blocks 68. In addition, the CIF frame 66 includes twelve groups of macro blocks ("GOBs") 70, each GOB 70 containing a 3×11 array of macro blocks 68. These data types are discussed in more detail below.

At block 210 in FIG. 3A, the encoder 54 (FIG. 2) sends the compressed data stream to an H.221 component (not shown) which, in turn, routes the stream to an ISDN interface (not shown). The ISDN interface sends the data stream over an ISDN line 72 to a public switched telephone network ("PSTN") 74. The encoding process for the frame then ends at block 212.

At block 216, the video decoder 56 receives the compressed data from the PSTN 74, The video decoder 56 decompresses the received data at block 218. A scaler 96 in the video decoder 56 scales the decompressed pixel data to fit the size of the display or window within which the video will be shown (block 220). At block 222, this data is sent to a video interface chip 78, then over a PCI bus 80 to a video card 82 and finally to the monitor 52. The decoding process for the frame then ends at block 224.

Figure 5:
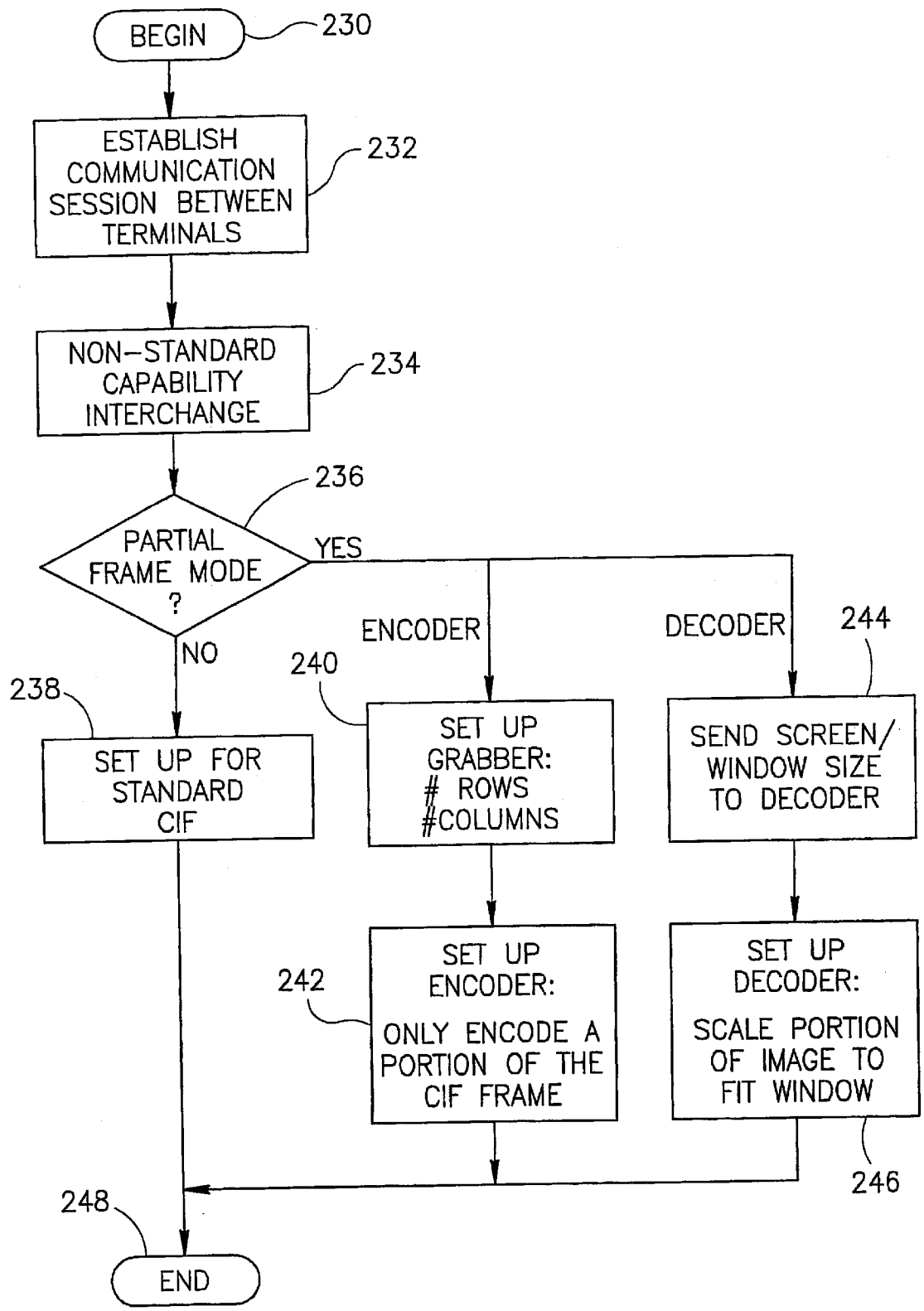
FIG. 5 is a flowchart illustrating initialization operations that may be performed by the system of FIG. 2.

Referring to FIG. 5 beginning at block 230, several initialization procedures that may be performed by the system S of FIG. 2 will be treated. At block 232, the terminals in the video teleconference (e.g., the video stations 100 in FIG. 8) establish a communication session. As discussed in more detail below, the H.261 video standard may be integrated into a more comprehensive standard such as H.320 that defines the overall set-up for a communication media, including video, audio, data and control channels. Within the H.320 standard, H.242, H.221 and other related standards define a set of protocols for session control and establishing communications. These and other standards are discussed in more detail below.

At block 234, the terminals convey information related to their ability to encode and decode according to the method of the invention. The embodiment of FIG. 2 uses a mechanism defined by the H.221 and T.35 standards, called non-standard capability interchange. This is a subset of the capability interchange protocol by which the terminals can convey information about their capabilities for receiving and/or transmitting different formats of standard video audio and data and about their non-standard capabilities. Details of the use of the non-standard capability exchange may be found in the H.221 reference discussed below and in the reference "Recommendation T.35 (1991)—Procedure for the Allocation of CCITT Defined Codes for Non-Standard Facilities," the contents of which is hereby incorporated herein by reference.

Using this non-standard mechanism, the encoding and decoding methods according to the invention (referred to hereafter as "partial frame mode") may be activated when the encoder in the transmitting terminal and the decoder in the receiving terminal support the partial frame mode (block 236). In any other case, the terminals use standard H.261 encoding and decoding methods (block 238).

When the partial frame mode is supported, the encoder 54 (FIG. 2) may perform some preliminary initializations. For example, the encoder 54 may set up the video grabber 58 to provide the desired number of rows and columns (block 240). Again, various frame formats may be specified such as the one discussed above, the SIF video standard, or other formats. In addition, at block 242, the encoder 54 may be set up to specify a particular algorithm or procedure for encoding only a portion of the CIF frame.

Similarly, the decoder 56 may perform some preliminary initializations. For example, the monitor 52 may send the current display size or window size to the decoder 56 (block 244). In addition, at block 246, the decoder 56 may be set up to map only a portion of the CIF frame to the display or window. The above initialization procedures terminate at block 248.

Figure 6:
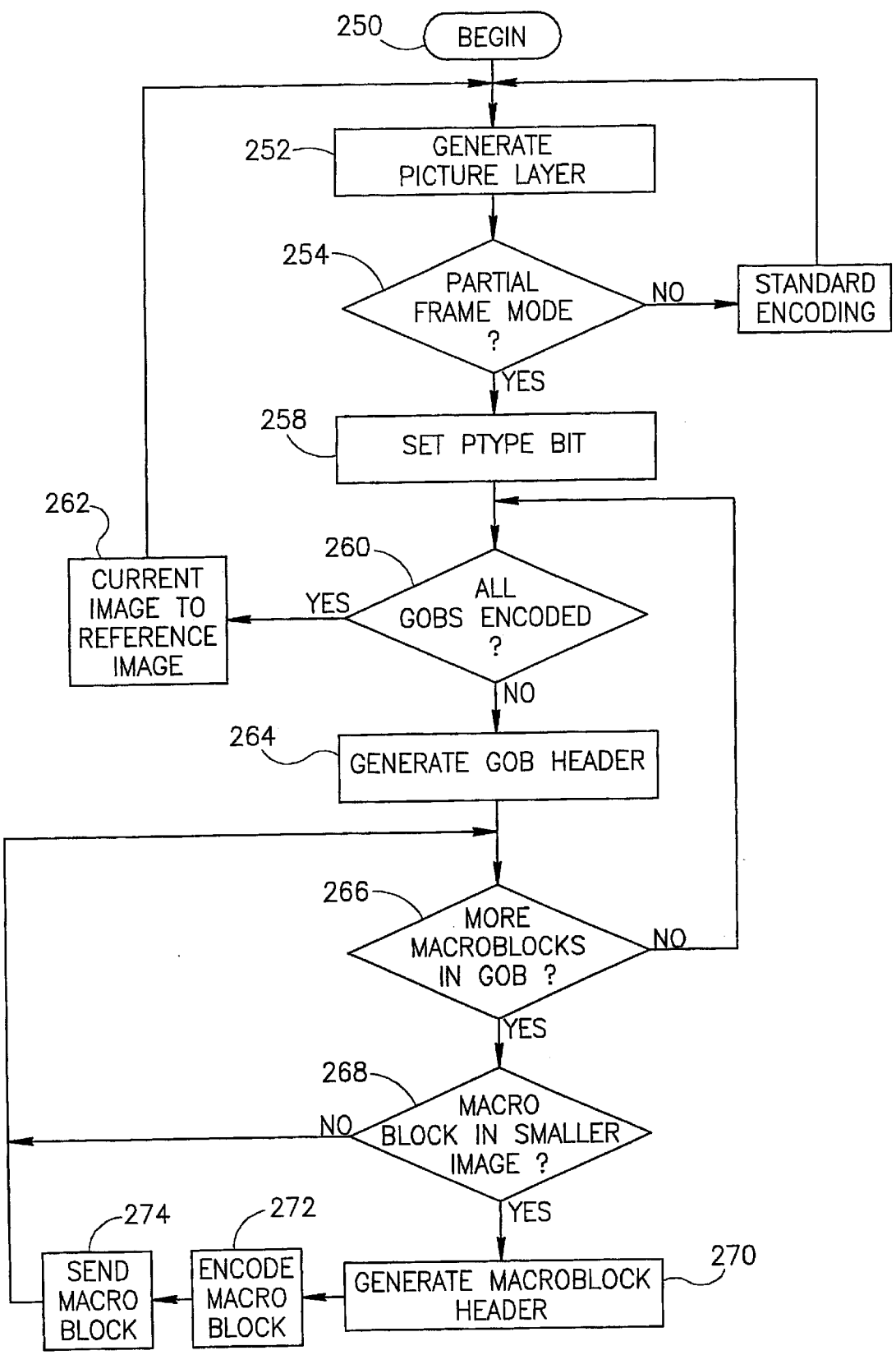
FIG. 6 is a flowchart illustrating video encoding operations that may be performed by the system of FIG. 2.

Referring now to FIG. 6 beginning at block 250, the operations of the video encoder 62 will be discussed in detail. At block 252 the video encoder 62 generates picture layer header information according to the H.261 standard. Then, at block 264, the encoder determines whether the encoders in the receiving terminals in the video conference support the partial frame mode. If the mode is not supported, the process proceeds to block 256 and the encoder performs the standard H.261 encoding process (block 86, FIG. 2). Details of H.261 encoding may be found in the reference "Recommendation H.261 (03/93)—Video Codec for Audio-visual Services at px64 kbit/s," the contents of which is hereby incorporated herein by reference. After the frame is encoded, the process returns to block 252.

If, at block 254, the partial frame mode is supported, the process proceeds to block 258 where a spare bit is set in the PTYPE section of the picture layer When this bit is set, it indicates that the current frame is using the partial frame mode.

At block 260, the video encoder 62 determines whether all of the GOBs 70 for this frame have been encoded. If so, the process proceeds to block 262 where, for every macro block 68 in the current frame, the current image is moved to the reference image in, for example, a data memory 63. These images are part of the standard H.261 processing discussed above. The process then returns to block 252.

If, at block 260, some of the GOBs 70 for this frame were not encoded, the process proceeds to block 264 where the video encoder 62 generates the GOB header. Next, the video encoder 62 determines whether there are more macro blocks 68 in the current GOB 70 that need to be encoded (block 266). If not, the process returns to block 260.

If there are more macro blocks 68 to be encoded, at block 268 the process determines whether the current macro block 68 is within the smaller image (e.g., the NTSC frame) and should be encoded. The manner of deciding which macro blocks are to be encoded will depend on how the NTSC frame is mapped to the CIF frame. One example follows.

In the embodiment of FIGS. 2 and 4, only the first 240 lines are encoded. Per the H.261 standard, only the changes of data between images need be sent. Hence, it is not necessary to send information for each macro block 68. Accordingly, the video encoder 62 or a macro block selector 90 may be configured so that the information for the lines past 240 is not encoded (and/or sent to the decoder).

There is an additional option by which the video encoder 62 can skip several columns (up to three) of macro blocks 68 on the right side of the image. This option may be used, for example, when these columns would not be displayed on the user window due to the aspect ratio constraints. In this case, the video encoder 62 or the macro block selector 90 may be configured to skip the encoding (and/or transmission) of those macro block columns. As a result, a system constructed according to the invention may provide even deeper compression.

The method of the invention also may be implemented in a manner that takes advantage of the structure of the GOBs 70. As stated above, in the ITU H.261 standard, the CIF image in memory is divided to 12 GOBs 70. Yet the 240×320 NTSC frame (FIG. 4) fits entirely within ten GOBs 70. Thus, a GOB selector 88 can be configured so that only the macro blocks 68 in the first ten GOBs 70 are encoded and sent to the decoder.

Moreover, when the horizontal skip option is activated, one to three of the rightmost macro blocks 68 in the right-hand side GOBs are not encoded. For example, all macro blocks in the odd numbered GOBs (i.e., the GOBs on the left except for GOB 11) are encoded. For the case where two of the rightmost macro blocks 68 are skipped, of the even numbered GOBs (i.e., the GOBs on the right except for GOB 12), only macro blocks 1–9, 12–20 and 23–31 are encoded. It should be noted that each macro block header contains the number of the corresponding macro block. Thus, the system can readily keep track of the macro blocks that were or were not sent.

If, at block 268, the current macro block 68 should not be encoded, the process returns to block 266 to process the next macro block 68.

If, at block 268, the current macro block 68 should be encoded, the process proceeds to block 270 and the encoder generates the header for the macro block 68. The H.261 encoder 86 then encodes the macro block 68 using standard H.261 procedures (or using H.263 procedures in an H.263-based embodiment). These processes are known in the art and will only be treated briefly here.

Initially, the previous image (after compressing and decompressing) is stored as the reference image in, for example, the data memory 63.

The input memory image is divided into square areas designated as macro blocks. The macro blocks are organized in groups of macro blocks. In the H.261 standard there are 396 macro blocks, 16×16 pixels each, organized in 12 GOBs as discussed above.

Thus, the encoder process is macro block oriented and, for each macro block, it performs the following steps:

Try to find a 16×16 patch, in the reference image, which is the most similar to the current macro block. This process is designated as motion search. If no similar patch is found, then the overlapping macro block in the reference image is chosen. The translation offset between the current macro block and the patch yielded by the motion search is called the motion vector. It is a 2 dimensional vector for the x axis and y axis offsets.

Calculate the differences between the current macro block and the selected patch. This is done for six 8×8 patches in the macro block comprising three color coordinates. The new set of patches of the differences is called INTER.

Transform the INTER to the frequency domain, with a transformation known as discrete cosine transform, or DCT.

For the DCT patches perform a process of quantizatlon, which reduces the number of bits per entry.

Use a data compression method known as Huffman Encoding.

In parallel to the last step, decode the quantized data (before Huffman Encoding) and save it in a memory image called the current memory image.

At block 274, the video encoder 62 sends the encoded (compressed) data stream to the decoder 56 The process then returns to block 266.

After all of the macro blocks for the current frame that are to be processed have been processed, the process proceeds to blocks 260 and 262 so that the current image may be used as the reference image for the next frame as discussed above. If it is needed, the embodiment of FIG. 2 may provide a scaler 89 that may be used to scale the image data when it is displayed on a display device (not shown) at the encoder terminal.

Figure 7:
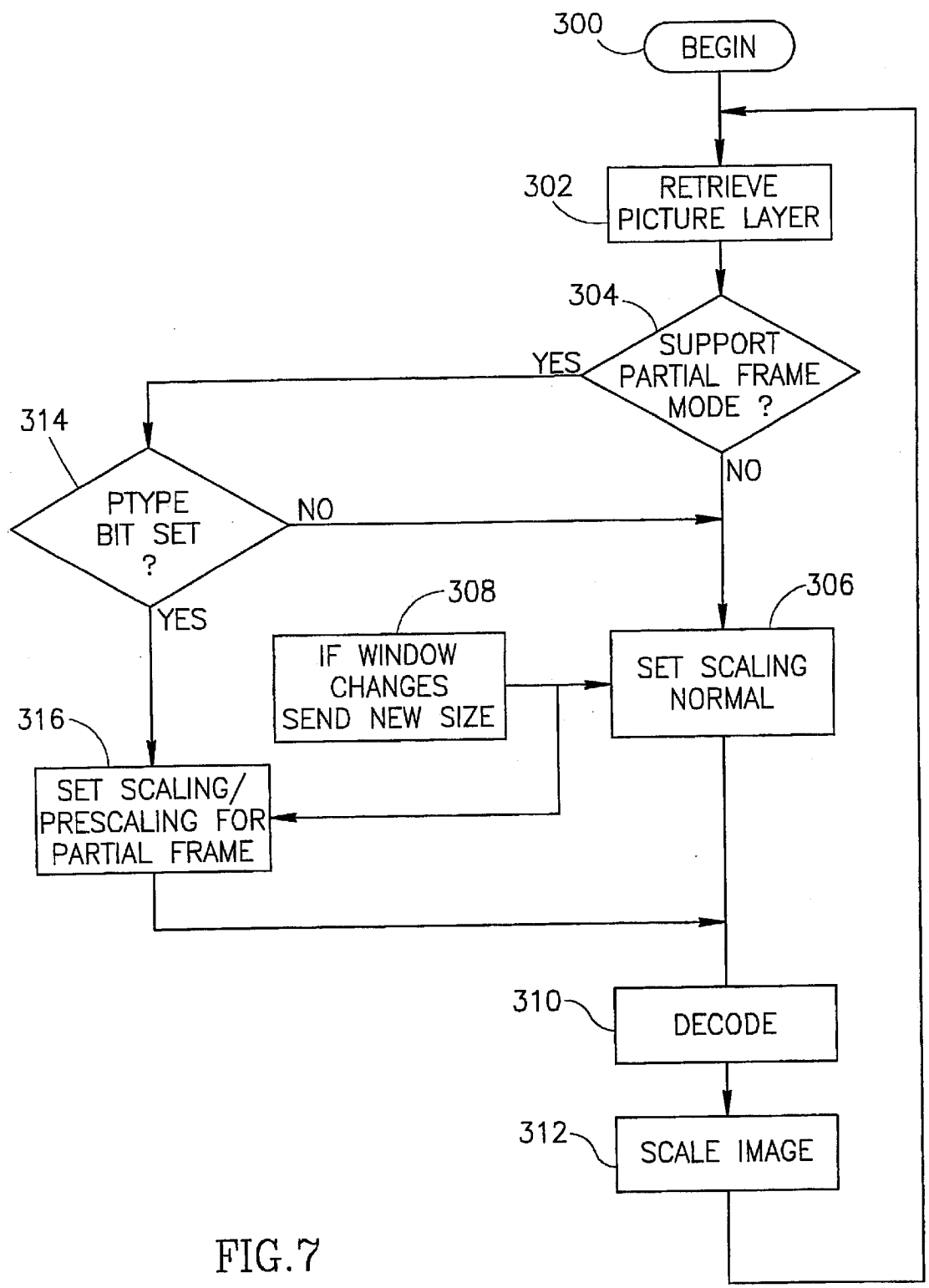
FIG. 7 is a flowchart illustrating video decoding operations that may be performed by the system of FIG. 2.

Referring now to FIG. 7 beginning at block 300, the operations of the decoder 56 will be discussed in detail. At block 302 the decoder 56 receives the picture layer header information. At block 304, the decoder 56 determines whether the transmit terminal in the video conference supports the partial frame mode.

If the mode is not supported, the process proceeds to block 306 where the encoder 56 sets the scaling from the CIF frame stored in a data memory 93 to a window 97 or a display screen 99 (FIG. 2). This scaling may change during the course of operations if, for example, the user changes windows 97 or changes the size of the window 97 (block 308).

Next, the process proceeds to block 310 where an H.261 decoder 94 performs the standard H.261 decoding process. Details of this decoding process may be found in the H.261 reference cited below. Briefly, the H.261 decoder processes are anti-symmetric to the H.261 encoder processes. Each function in the H.261 encoder 86 has its inverse, in the H.261 decoder 94. The order of the functions is also inverted. In the following order, the H.261 decoder 94 performs: Huffman Decoding, de-quantization, inverse DCT transform, and summation, according to the motion vector offset. A scaler 96 then scales (typically up-scales) the image (block 312) and returns to block 302 to process the next frame.

If, at block 304, the partial frame mode is supported, the process proceeds to block 314 where the decoder 56 determines whether the spare bit is set in the PTYPE portion of the picture layer. If the bit is not set, the process proceeds to block 306 to perform the standard H.261 decoding as discussed above.

If, at block 314, the bit is set, the decoder 56 sets the scaling at block 316 so that the decoder will perform the appropriate scaling (typically up-scaling) of the first 240 lines Into the requested user window display.

In the embodiment of FIG. 2, this may involve using a prescaler 98 to define the window or display size as being larger than it actually is. This is done to accommodate the blank areas in the received CIF frame. In this case, the process then performs operations similar to those discussed above in conjunction with block 306 so that the received CIF frame will be properly scaled to the window/display at block 312. This technique may be useful in configurations where it is relatively difficult to directly map a portion of the received CIF image to the display or window.

Figure 8:
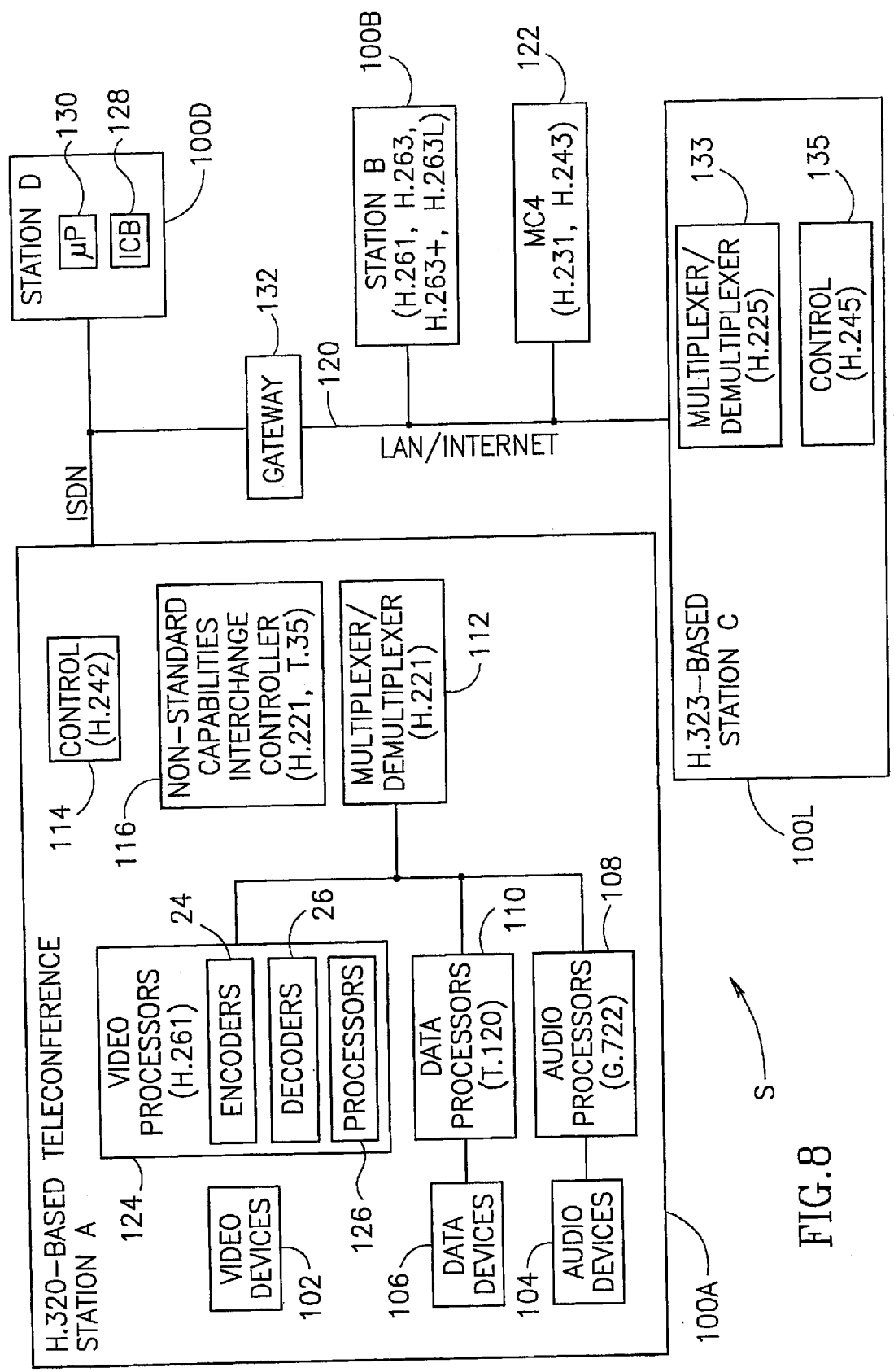
FIG. 8 is a block diagram of one embodiment of a video teleconferencing system constructed according to the invention.

Referring to FIG. 8, one embodiment of an H.320-compliant video teleconferencing system 8 that supports multiple video teleconference stations 100 is shown. As mentioned above, H.261 can be integrated into a comprehensive framework of standards such as H.320. H.320 defines the overall set-up for a communication media, including video, audio, data and control channels. The details of H.320 may be found, for example, in the reference "Recommendation H.320 (03/96)—Narrow-band Visual Telephone Systems and Terminal Equipment," the contents of which is hereby incorporated herein by reference. H.221 and related standards define the infrastructure through which those channels are fused together.

In the embodiment of FIG. 8, each video teleconference station 100 may have the ability to transmit and receive audio, video and data. Hence, each station may include video devices 102, audio devices 104 and data devices 106. To reduce the complexity of FIG. 8, only station A 100A illustrates most of the components in a given station 100.

The video devices 102 include video sources that provide video streams to one or more video processors 124. To support two-way video, each video processor includes an encoder 24 and a decoder 26. As discussed above, the encoder 24 may include a video grabber and a video encoder. The video grabber has the ability to attach to an external video source, such as video camera or VCR, and convert this video to data in an electronic digital memory image. Also as discussed above, the video encoder converts the uncompressed memory image, into a compressed stream of data.

The stations 100 include audio processors 108 and data processors 110 to provide various functions for the audio devices 104 and data devices 106, respectively. For example, the audio processors 108 may provide G.722-compliant audio compression. The data processors 110 may provide T.120-compliant data operations.

The information streams from the processors 124, 108 and 110 (e.g., the compressed stream of video data from the video processor 124) are sent to a multiplexer/demultiplexer 112. The multiplexer part of the multiplexer/demultiplexer 112 combines these streams and sends the combined stream to other stations 100. The multiplexer/demultiplexer 112 may be compliant with H.221 or other related standards Details of the H.221 standard may be found, for example, in the reference: "Recommendation H.221 (07/95)—Frame Structure for a 64 to 1920 kbit/s Channel in Audiovisual Teleservices," the contents of which is hereby incorporated herein by reference.

Each station 100 also performs various processes to handle the protocols supported by the station. For example, a control process 114 may be compliant with H.242 or other similar protocols. A non-standard capabilities interchange controller 116 may use H.221 and T.35 messages as discussed above or it may use other similar messages. Details of the operations related to the H.242 standard may be found, for example, in the reference "Recommendation H.242 (03/96)—System for Establishing Communication Between Audiovisual Terminals Using Digital Channels up to 2 Mbit/s," the contents of which is hereby incorporated herein by reference.

Inbound information from a remote station (e.g., station D 100D) is routed to the multiplexer/demultiplexer 112. The demultiplexer part of the multiplexer/demultiplexer 112 separates the received stream into individual audio, data and video streams and sends them to the audio processor 108, data processor 110 and video processor 124, respectively. The audio and data streams are processed and sent to the audio devices 104 and the data devices 106, respectively.

In the video processor, the decoder 26 converts the compressed video data stream into an uncompressed memory image as discussed above. The memory image is sent to display devices, such as a monitor, a TV set or a computer screen, in the video devices 102 to display the memory image.

The embodiment of FIG. 8 illustrates both ISDN-based stations (e.g., station A 100A) and LAN-based stations (e.g., station C 100C). The LAN-based stations are H.323-compliant and connect to a LAN or Internet (LAN/Internet) 120. Here, the multiplexer/demultiplexer operations 133 are based on H.225 and the control operations 135 are based on H.245. If desired, the ISDN-based stations may communicate with the LAN-based stations via a gateway 132.

An MCU 122 provides certain multi-point control operations for the stations 100. See for example "Recommendation H.231 (1993)—Multipoint Control Units for Audiovisual Systems Using Digital Channels" and "Recommendation H.243 (03/96)—Procedures for Establishing Communication Between Three or More Audiovisual Terminals Using Digital Channels up to 1920 kbit/s," the contents of which are hereby incorporated herein by reference. These components are well known in the data communication art and will not be treated in detail here.

FIG. 8 also illustrates two alternative implementations for the video processing components. In station A 100A, the video processing operations are performed by a unit that includes processor 126, decoder 26 and encoder 24 components. In station D 100D, the video processing operations are performed by a unit that includes a standard image capture board 128 and a standard microprocessor 130 such as an "PENTIUM MMX" sold by Intel Corp. In the later embodiment, most of the encoding and decoding operations are handled by software programs executed by the microprocessor.

From the above it may be seen that the invention provides an improved method of transmitting video streams and that above description illustrates but one embodiment of the invention. It will be apparent to one skilled in the art that the teachings of the invention are applicable to other frame sizes and to video compression standards other than H.261. In addition, skip values other than those discussed above may be used for the horizontal axis and the vertical axis. For the capability interchange, other methods can be used beside H.221 and T.35 non-standard capabilities. A discussion of a few typical variations follows.

A variety of methods may be used for sending a smaller frame within a larger one. For example, denoting the smaller frame size by Fs and the larger frame size by Fl. Macro block ordering may be accomplished as follows:

Let K be the number of macro blocks within the smaller frame.

Let N be the number of the macro blocks within the larger image.

Obviously K<=N.

Define an order function on the macro blocks—i.e., assign a unique number to each of the macro blocks in each GOB (e.g., by using a look up table). This may be done in such a way that the first K values will be given to macro blocks belonging to the smaller frame. Denoting this assignment by:

Fgm(Gobind,Mbøind)

During encoding when processing macro block <J> in GOB <|> if Fgm(I,J)<=K: encode normally else; do not encode the macro block (e.g., by a replenishment process)

An exemplary replenishment simulation follows: When the memory area in Fl-Fs is set to a constant value, the encoder process will automatically skip the macro blocks included in this area. This is done because in the 8×8 Inc. implementation of the H.261 standard includes a replenishment mechanism whereby when the sum of absolute differences between the current block and the previous one is smaller than a certain threshold the differences will not be sent.

In addition to the block-oriented schemes described above, the invention may be practiced using compression schemes that are not block-oriented. This includes, for example, compression standards that dynamically segment the image into distinct areas.

There are also many alternative ways to send the special capabilities to the other terminals (stations). For example, the MBE mechanism as defined by H.221 may be used. The NS Comm mechanism as defined by H.221 may be used. As shown for the LAN-based embodiment in FIG. 8, these capabilities may be sent via using messages based on H.225 and H.245 (blocks 133 and 135). Details of these standards may be found, for example, in the following references, the contents of which are hereby incorporated herein by reference. "Recommendation H.245 (03/96)—Control Protocol for Multimedia Communication." "Recommendation H.225 (11/96)—Media Stream Packetization and Synchronization on Non-Guaranteed Quality of Service LANs."

The capability Information may be encoded directly in the video audio or data stream. A predefined setting may be used when the type of the local or remote terminal(s) is known.

The video stations discussed above may be implemented to support a variety of standards including H.321, H.322, H.323 and H.324. Under these standards, video may be provided according to the H.261 standard or standards such as H.263, H.263+ or H.263L as illustrated by station B 100B in FIG. 8. These standards support several CIF-based frame definitions including CIF, QCIF, SUB-CIF and 4CIF. Details of these standards may be found, for example, in the following references, the contents of which are hereby incorporated herein by reference. "Recommendation H.263 (03/96)—Video Coding for Low Bit Rate Communication." "Recommendation H.321 (03/96)—Adaptation of H.320 Visual Telephone Terminals to B-ISDN Environments." "Recommendation H.322 (03/96)—Visual Telephone Systems and Terminal Equipment for Local Area Networks Which Provide a Guaranteed Quality of Service." "Recommendation H.323 (11/96)—Visual Telephone Systems and Equipment for Local Area Networks Which Provide a Non-Guaranteed Quality of Service." "Recommendation H.324 (03/96)—Terminal for Low Bit Rate Multimedia Communication." "Recommendation H.230 (07/95)—Frame-Synchronous Control and Indication Signals for Audiovisual Systems," the contents of which are hereby incorporated herein by reference.

The systems of FIGS. 2 and 8 may be implemented using a variety of components. For example, video grabbers and related circuits are well known in the video art. An exemplary video grabber is the SAA-7110 (OCF-1) sold by Philips Semiconductors. The operation of this device is described in the publication entitled "DATA HANDBOOK IC22 Desktop Video 1995." The video encoder or video decoder may be a VCP Single Chip Video Codec and Multimedia Communication Processor sold by 8×8 Inc. A software reference for this device is H.320/H.261 CODEC Version 3.0. A hardware reference for this device is the Engineering Reference Specification (ERS) Vision Compression Processor. In addition, the video interface chip may be a VPIC chip sold by 8×8 Inc. Finally, encoder boards and decoder boards that can be configured to provide the above functionality are available from Vcon, Ltd., model number: "CRUISER 150P."

From the above, it may be seen that the invention provides an improved video transmission system. While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. Thus, the specific structures and methods discussed in detail above are merely illustrative of a few specific embodiments of the invention.

What is claimed is:

1. A method for transmitting a video signal of a first format via a communication protocol for a second format, said method comprising:

mapping data elements from a first data array representing a portion of a frame of the video signal of the first format into a second data array representing a portion of a frame of a video signal of the second format, wherein the number of rows and columns in the second data array is equal to or greater than the number of rows and columns in the first data array;

setting to an arbitrary value each element in the second data array which does not correspond to an element in the first array; and transmitting the second array according to the communication protocol for the second format.

2. The method according to claim 1, further comprising the step of receiving the second data array.

3. The method according to claim 2, further comprising decoding into a video image data elements in the second data array corresponding to data elements in the first array.

4. The method according to claim 3, further comprising scaling the decoded video image according to a size of a display media.

5. The method according to claim 4, wherein the display media comprises a window on a display screen.

6. The method according to claim 1, wherein the first video format is NTSC.

7. The method according to claim 1, wherein the second video format is CIF.

8. The method according to claim 6, further comprising frame grabbing an NTSC signal to produce the first data array.

9. The method according to claim 7, further comprising packetizing the second data array.

10. A system for transmitting a video signal of a first format via a communication protocol for a second format, said system comprising:

a data processor to map data elements from a first data array representing a portion of a frame of the video signal of the first format into a second data array representing a portion of a frame of a video signal of the second format, wherein the number of rows and columns in the second data array is equal to or greater than the number of rows and columns in the first data array, said data processor also adapted to set to an arbitrary value each element in the second data array which does not correspond to an element in the first array; and a data transmitter to transmit the second array according to the communication protocol for the second format.

11. The system according to claim 10, further comprising a data receiver to receive the second data array.

12. The system according to claim 10, further comprising a frame grabber to grab a frame of a signal in the first format.

13. The system according to claim 10, further comprising a packetizer to packetize the second data array.

* * * * *